Fig.1.

Victor H. Severy
INVENTOR

ATTORNEYS

May 4, 1937.  V. H. SEVERY  2,078,979
MAGNETIC CONTROL APPARATUS FOR MUSICAL INSTRUMENTS
Filed July 10, 1933   8 Sheets-Sheet 4

Victor H. Severy
INVENTOR.
BY Lyon & Lyon
ATTORNEYS.

May 4, 1937. V. H. SEVERY 2,078,979
MAGNETIC CONTROL APPARATUS FOR MUSICAL INSTRUMENTS
Filed July 10, 1933 8 Sheets—Sheet 5

Victor H. Severy
INVENTOR.
BY Lyon Lyon
ATTORNEYS.

Fig. 24.

May 4, 1937.  V. H. SEVERY  2,078,979
MAGNETIC CONTROL APPARATUS FOR MUSICAL INSTRUMENTS
Filed July 10, 1933  8 Sheets-Sheet 8

Inventor
Victor H. Severy

By Lyon+Lyon
Attorneys

Patented May 4, 1937

2,078,979

UNITED STATES PATENT OFFICE 2,078,979

MAGNETIC CONTROL APPARATUS FOR MUSICAL INSTRUMENTS

Victor H. Severy, Los Angeles, Calif., assignor to Creative Industries, Inc., a corporation of Nevada Application July 10, 1933, Serial No. 679,632

11 Claims. (Cl. 84—259)

This invention relates to magnetic apparatus for actuating vibrators, and the invention is particularly applicable when employed for vibrating the vibrators of musical instruments; and while the invention can be applied to different musical instruments, in the present specification, it is described as applied to a piano.

One of the objects of the invention is to provide simple means controlled by keys such as the piano keys, for effecting the vibration of the strings through the agency of magnetic forces, and thereby producing organ tones, of fine quality, and in which harmonic tones are controlled by the musician.

While the apparatus can readily be built into a piano, when the piano is being manufactured, one of the objects of the invention is to construct the apparatus as an accessory which can be mounted on any completed piano for which it is designed, adjacent to the piano strings. This enables an ordinary piano to be transformed so that it can perform the functions and attain the charming musical effects of a costly organ.

In employing the invention, I provide a rotary member or rotor corresponding to each string, and each rotor is provided with circumferentially spaced elements or "poles." The rotor is rotated at a predetermined speed, so that the poles will pass the string at a frequency corresponding substantially to the period of vibration of the string. Through the action of magnetic or electromagnetic forces, impulses are given to the string periodically, at the same frequency as the natural period of vibration of the string. In this way the string produces its note. One of the objects of the invention is to provide apparatus of this kind, of simple and compact construction, which can readily be mounted adjacent to the piano strings for controlling their vibration by depressing the piano keys; also to provide means whereby harmonic vibrations may be developed at will by the musician, by the simultaneous vibration of strings higher up in the scale, and without striking the key corresponding to the string that is higher in the scale.

A further object of the invention is to provide a construction for the rotors, which may be employed when desired, to produce harmonic vibrations in the strings.

A further object of the invention is to provide simple means for controlling the volume of the tones produced by the vibrators or strings.

A further object of the invention is to provide simple means for developing impulses in an electric circuit, at a frequency corresponding to the natural period of vibration of the vibrator or string, cooperating with amplifying means, and electro-mechanical means for vibrating the strings.

A further object of the invention is to provide simple means for producing organ tones from an ordinary piano.

Further objects of the invention will appear hereinafter.

The invention consists in the novel parts and combination of parts to be described hereinafter, all of which contribute to produce an efficient magnetic control apparatus for musical instruments.

A preferred embodiment of the invention is described in the following specification, while the broad scope of the invention is pointed out in the appended claims.

In the drawings:

Figure 8 is a detail section taken about on the line 8—8 of Figure 9, and illustrating one of the rotors, and the wiring for the same, certain parts being broken away.

Figure 9 is a side elevation of the rotor illustrated in Figure 8. Figures 8 and 9 both illustrate the relation of each rotor to its corresponding string.

Figure 10 is a diagrammatic view illustrating a type of rotor in which permanent magnets are employed. In this view, certain parts are broken away, or shown in section. This view illustrates a type of construction in which a shield is mounted between the string and the rotor, together with key-controlled means for withdrawing the shield at will, to permit the rotor to vibrate the string.

Figure 11 is a vertical section taken about on the line 11—11 of Figure 10, but omitting the shield and the string.

Figure 12 is a diagrammatic view illustrating a special winding and circuit arrangement for a rotor, enabling different sets of the poles to be excited at will.

Before proceeding to a more detailed description of the invention, it should be stated that in practicing the invention, I provide a rotor adjacent to the string or part to be vibrated, and this rotor is formed with equidistant poles or elements, which, as they pass the vibrator, exert magnetic force upon the vibrator to actuate it. The rotor is rotated at a speed which enables the poles or teeth of the rotor to pass the vibrator at a frequency corresponding to the natural period of vibration of the vibrator. In one type of the invention the poles on the vibrator carry coils, but in other types a single magnet is mounted so as to cooperate with the poles as they pass adjacent to it to develop the magnetic forces periodically to vibrate the vibrator or string.

Figure 13:
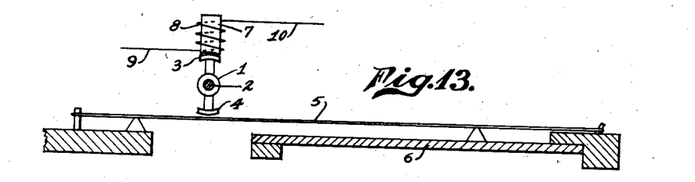
Figure 13 is a diagrammatic view illustrating a simple embodiment of rotor, in which two elements or "poles" are employed diametrically opposite to each other, and showing the rotor mounted adjacent to a piano string, for vibrating it, the sounding-board of the piano being shown in section.

A simple embodiment of the invention is illustrated in Figure 13, in which 1 illustrates a rotor carried on a rotating shaft 2 and provided with two diametrically opposite elements or poles 3 and 4. This rotor is mounted adjacent a vibrator, for example, a piano string 5 mounted on a sounding board 6. On the side of the rotor remote from the string, I provide an electromagnet 7 having a coil 8 which is connected in to an electric circuit through the medium of conductors 9 and 10. This circuit is controlled by a piano key corresponding to this string. When the key is depressed, the electromagnet 7 is energized, and when the poles 3 and 4 are in the position indicated, magnetic forces are induced in them, which attract the string. The shaft 2 is rotated at a speed to enable these pole pieces to pass the string at a frequency to correspond with the period of vibration of the string, and vibrate the string. And it is unnecessary to provide the string with an armature to cooperate with the electromagnet. The string is devoid of an armature.

Figure 14:
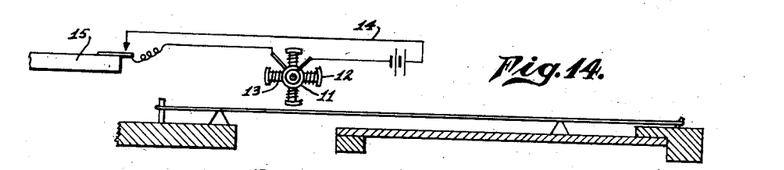
Figure 14 is a view similar to Figure 13, but representing a rotor having four poles and of a different type, in which the poles are excited by coils placed around them, and wired into a circuit normally open but capable of being closed by key.

Figure 14 illustrates another embodiment of the invention, in which the rotor 11 is provided with four poles 12, each pole being provided with its own exciting coil 13, and these exciting coils are connected in series into a circuit 14 which is closed by the upward movement of the rear end of the key 15, that is to say, one of the piano keys. In the embodiment illustrated in Figure 15, the rotor 16 is of substantially the same type illustrated in Figure 14, but its poles are constantly excited through the agency of a closed circuit 17. Between the rotor and the string 18, a magnetic shield 19 is mounted. This shield is normally interposed between the rotor and the string, and its presence weakens the force of magnetism passing to the string, to such an extent that the rotation of the rotor will not vibrate the string. By depressing a key 20, the shield can be swung to one side through the agency of the link 21 attached to a bell crank lever 22. One arm of this bell crank lever is connected to the shield, and the shield is mounted in a suitable suspended guide 23 supported from the fixed part or rail 24. If desired, an electromagnet pick-up device 25 may be employed, the core of which is mounted adjacent to the string, and this electromagnet device includes a coil 26 connected to circuit wires 27.

Figures 15, 16, 17, 18:
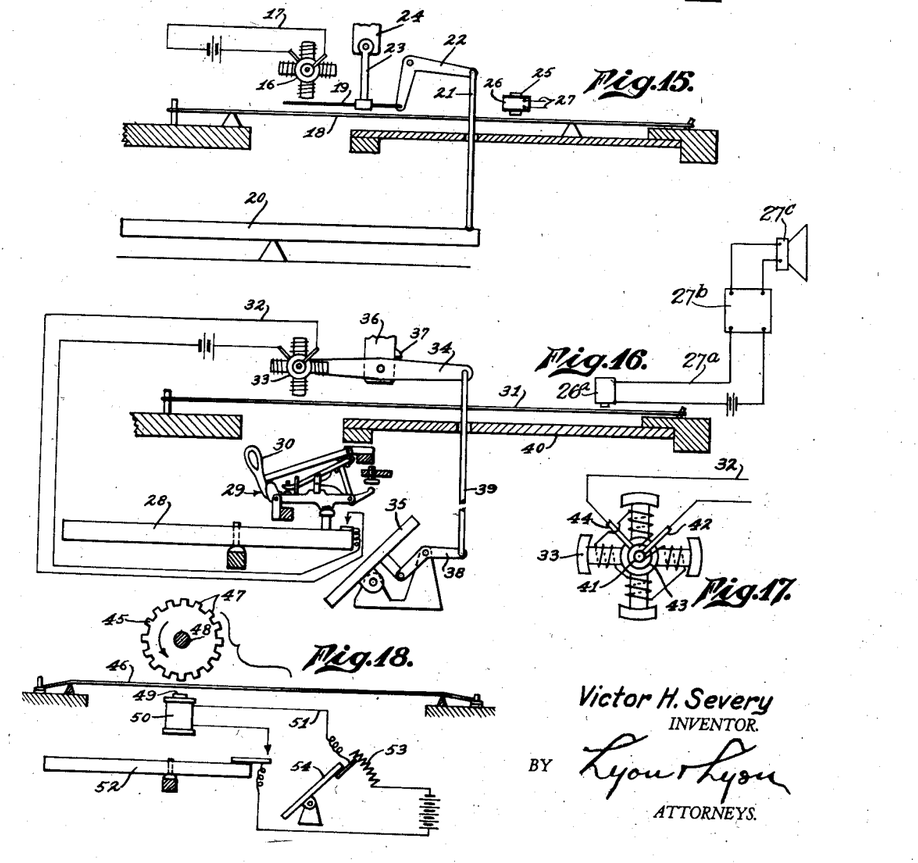
Figure 15 is a view similar to Figure 14, showing the same type of rotor but in which the poles of the rotor are constantly excited. This view illustrates the use of a shield controlled by the key, which, when depressed, effects the withdrawal of the shield to permit the rotor to vibrate the spring. This view also illustrates an electromagnet pickup device located adjacent the string, for producing impulses in a circuit with a frequency corresponding to the period of vibration of the string.
Figure 16 is a view similar to Figure 15, but illustrating means whereby the string can be struck by the hammer action actuated by the key, the circuit through the rotor being closed by the depression of the key. This view also illustrates a pedal with means controlled thereby, for raising or lowering the rotor to vary the volume of tone produced by the string.
Figure 17 is a diagrammatic view illustrating the wiring of the poles of a four-pole type of rotor, together with the lead in wires for carrying the current through the exciting coils of the poles.
Figure 18 is a diagrammatic view illustrating another embodiment of the invention, in which I employ a rotor of magnetic material such as soft iron located on one side of the string, and preferably above it, and with an electromagnet located below the string opposite the rotor. This view also illustrates the circuit for the electromagnet with a key for closing the same, together with means for varying the force of the current passing through the coil of the electromagnet to vary the volume of the tone produced by the strings.

In Figure 16 I illustrate an embodiment of the invention, in which each piano key 28 operates a hammer action 29, which drives a hammer 30 up against the under side of the string 31. This same key closes a circuit 32 through a rotor 33, the shaft of the rotor being mounted on a lever 34 that is controlled by a pedal 35 to enable the rotor to be raised or lowered to vary the volume of the tone produced by the string. Two or more of the levers 34 would be provided, supported on a fixed part or rail 36. Any suitable stop means such as a projection 37 would be provided for limiting the downward movement of the rotors. The pedal 35 may be connected to the lever or levers 34 in any suitable manner, for example, by means of a bell crank lever 38 and a link 39 passing up through an opening in the sounding board 40. If desired, an electromagnet 26a may be fixed over each string and connected in a circuit 27a through an amplifier 27b, the output side of which connects to a loud speaker 27c. Vibration of the string 31 when struck by the hammer 30 induces amplified impulses that are translated into sound by the loud speaker.

In Figure 17 I illustrate an enlarged detail of the windings for the poles of the rotor illustrated in Figure 14. This wiring is a common form of wiring in which the coils on the poles are connected in series, one end of the connected coils being attached to an insulated contact ring 41 cooperating with a brush 42, and the other end being attached to an insulated contact ring 43 that cooperates with the brush 44.

In the embodiment of the invention illustrated in Figure 18, I provide a rotor 45 above the string 46, and this rotor is made of magnetic material either in the form of a ring or a disc, and having a plurality of equidistant spaced projections, elements or teeth 47. I refer to these teeth as "poles" because they simulate the action of the poles 3 and 4 referred to in connection with Figure 13. A plurality of these rotors 45 are mounted on a shaft 48 extending transversely to the strings 46. Under each string I provide an electromagnet having an armature 49 that lies near the lower side of the string, and the coil 50 of this electromagnet is connected into a circuit 51 which can be closed at will by depression of a corresponding piano key 52. If desired, the circuit may include a variable resistance 53 controlled by a foot pedal 54. This will enable the volume of the sound to be controlled at will. As each "pole" 47 passes the string, it cooperates with the magnetic lines of force so as to increase the quantity that passed to the rotor. In this way, the power of the lines of force will be alternately decreased and diminished as the poles pass the string. The number of poles or teeth 47 is such that when the shaft 48 is rotated at a uniform speed, they will pass the string with a frequency corresponding to the period of vibration of the string. Hence, whenever the key 52 is depressed, the magnetic lines of force from the magnet cooperating with the rotor, will vibrate the string.

Figures 8, 9, 10, 11, 12:
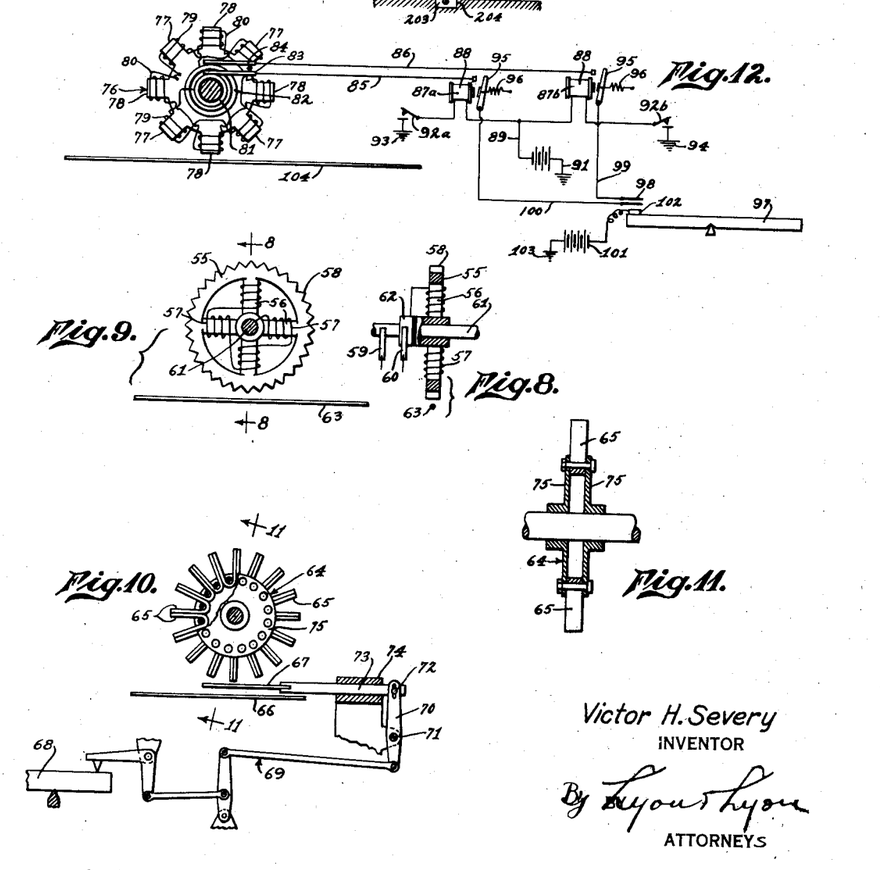

In Figures 8 and 9 I illustrate a type of rotor in which the rotor 55 is in the form of a ring with radial spokes 56 which are integral with the rim of the rotor. These spokes 56 operate as poles, and carry coils 57 which are connected in series. The periphery of the rotor is formed with equidistant teeth or "poles" 58. A circuit controlled by the corresponding piano key, is passed through the coils by utilizing brushes 59 and 60 touching the shaft 61 and an insulated contact ring 62. This rotor is mounted near the string 63 which it is to vibrate, and is, of course, rotated at a uniform rate of speed so as to have the poles 58 pass the string at the proper frequency for vibrating that string.

In Figures 10 and 11 I illustrate an embodiment of the invention in which I may employ a rotor 64 composed of a plurality of permanent magnets 65. These magnets may be of U form with the poles of adjacent magnets abutting against each other. This rotor is mounted close to the string 66 which it is to vibrate, and between the string and the rotor I provide a shield 67 of soft magnetic metal such as iron. When this shield is in place between the rotor and the string, it absorbs the lines of force and prevents the rotating armature from vibrating the string. Each shield 67 can be withdrawn at will, by depressing the piano key 68 that corresponds to this string. The rear end of this key actuates mechanism 69 including a lever 70 mounted on a fixed pivot 71 which has a pin-and-slot connection 72 with the rear end of the carriage 73, the forward end of which carries the shield. Whenever the carriage or slide 73 is actuated, it slides through a fixed guide 74. As illustrated in Fig. 11, the permanent magnet 65 may be clamped between two side plates 75.

In Figure 12, I illustrate a special construction for a rotor 76, in which the rotor is provided with a plurality of poles disposed in two sets, one set being composed of alternate poles 77, and the other set being composed of alternate poles 78. Each set of poles has its own corresponding series of exciting coils 79 and 80. The coil 79 is connected to an insulated contact ring 81, and the other coil is connected to an insulated contact ring 82. These rings are in contact with corresponding brushes 83 and 84 that are connected into a circuit by conductors 85 and 86. Corresponding to each of the conductors 85 and 86, there is provided a relay. These relays are indicated respectively, by the numerals 87a and 87b. The coils 88 of the relay magnets are wired in parallel by conductors 89 from one side of a source of E. M. F., or battery 90, the other side of the battery being connected to a ground 91. The other ends of the coils are connected to tappets 92a and 92b, to grounds 93 and 94. The switch member 95 of each relay is normally held open by a spring 96. When the piano key 97 is depressed, it closes a switch 98 that connects conductors 99 and 100, thereby connecting either one of the switch members 95 into a circuit, passing through either one of the series of coils of the rotor. For example, if the tappet 92a has been previously closed, the current will pass through the series of coils that are connected with the brush 83. The current through the switch 98 is supplied from a battery 101, one side of which is connected to a contact 102 on the key, the other side of which is connected to a ground 103. The rotor 76 is mounted adjacent to a string 104 that is to be vibrated. If only one of the tappets 92a or 92b is closed, half of the poles of the armature will be active. Hence, if both tappets are closed, all of the poles will be active, and this will double the number of impulses that the rotor will give to the string at each revolution of the rotor.

Figures 25, 26, 27, 28, 29, 30, 31, 32:
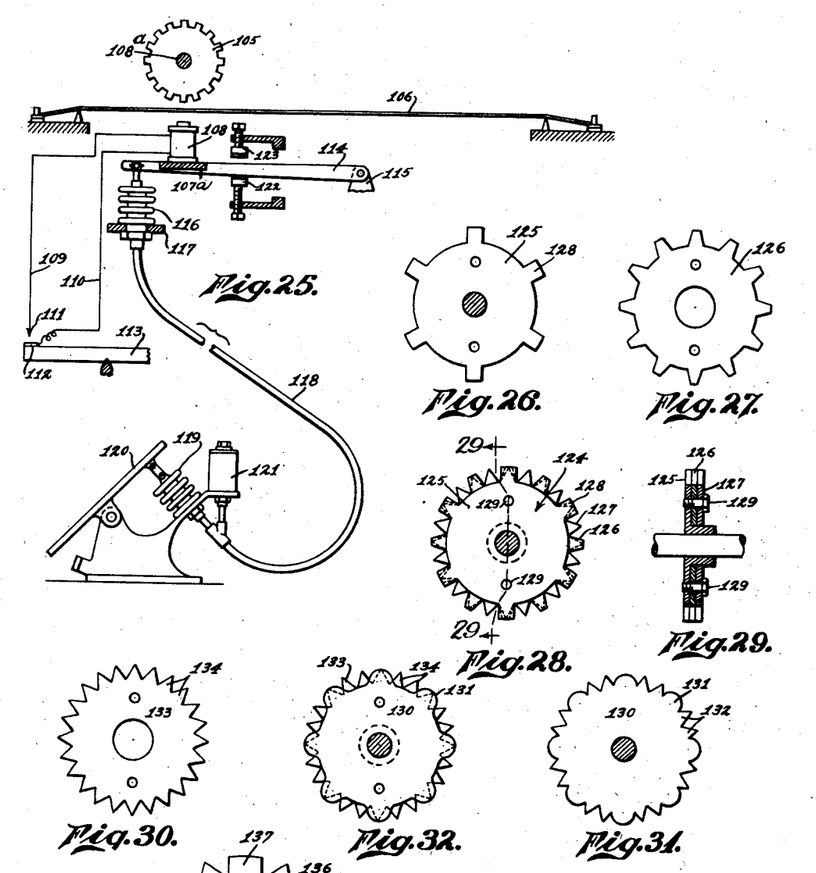
Figure 25 is a diagrammatic view corresponding to Figure 18, and is a vertical section through a stringed instrument, illustrating the same type of rotor, but illustrating another type of means for raising and lowering the carriage on which the electromagnets are mounted. This view illustrates the use of a hydraulic means for raising and lowering the carriage to control the volume of music produced by the strings.
Figure 26 is a side elevation of a disc which may be employed in forming a composite rotor, such as illustrated in Figure 28, in which the rotor itself develops harmonic vibrations in the string.
Figure 27 is a view similar to Figure 26, illustrating another disc to be used in forming the composite rotor, and having poles of a different character from the poles employed on the disc shown in Figure 26.
Figure 28 is a side elevation of a rotor of composite type, and formed of a plurality of discs.
Figure 29 is a vertical section taken about on the line 29—29 of Figure 28, the shaft of the rotor being broken away.
Figures 30 and 31 illustrate discs of two different types, which may be employed to form a composite disc such as illustrated in Figure 32.
Figure 32 is a side elevation of a composite rotor formed of discs having the character illustrated in Figures 30 and 31.

In the embodiment of the invention illustrated in Figure 25, I utilize the general principles of construction illustrated in Figure 18, that is to say, I mount the rotors such as rotor 105 above the corresponding string 106. Below the string I provide a magnet carriage or bar 107a, which extends longitudinally under the shaft 108a that carries the rotors. Under each rotor an electromagnet 108 is provided, the coil of which is connected by circuit wires 109 and 110 to contacts 111 and 112 associated with the rear end of the piano key 113 that corresponds to this string. The magnet bar is mounted for controlled up and down movement. In the present instance, I accomplish this by mounting the magnet bar on rigid levers 114 which are supported on fixed fulcrums 115. Suitable means is provided for raising and lowering the carriage at will, to control the volume of sound produced by the strings. In the present instance, I have illustrated pneumatic or hydraulic means for accomplishing this. For this purpose I employ a device that extends or contracts in accordance with internal pressure. For this purpose, I employ a device known as a sylphon 116 seated on a fixed support 117, the upper end of the sylphon being connected to one of the levers 114. This sylphon is expanded internally at will, by a fluid or liquid within a tube 118, which extends down and is connected to a sylphon 119 which can be compressed by a pedal 120. An overflow reservoir 121 may be provided for taking care of excess liquid in the tube.

A lower stop 122 is provided for limiting the downward movement of the magnet bar 107, and an upper stop 123 for limiting its upper movement. These stops are preferably adjustable as indicated.

In Figures 26 to 29 inclusive, I illustrate a construction of a rotor 124 which is of composite form, and composed of a plurality of discs 125, 126 and 127. The discs 125 and 126 are illustrated in Figures 26 and 27, removed from the rotor. These discs have equidistant poles such as the poles 128 of the disc 125. The poles of the different discs are located on a different pitch, that is to say, they differ in number so that when the discs are secured together in proper alignment by means of bolts 129, the poles of the discs 126 and 127 will be located between the poles 128 of the disc 125. The poles 128 may be employed in using a rotor of this kind for producing fundamental notes, and the intermediate poles employed to produce harmonic vibrations in the string. The poles of the discs 126 and 127 can be tapered if desired, to reduce their mass, and thereby reduce their effect on the lines of force as compared with the poles 128. In this way, harmonic vibrations of less force and amplitude can be imparted to the strings. The character of these harmonic poles can be varied to control the volume of harmonics. This enables an accurate control by means of the rotor, of the quality of the sound produced by a string.

In Figure 31 I illustrate another form of disc which may be used in forming a composite rotor. This disc is formed with equidistant poles, but certain of the poles have a different outline from the poles intermediate between them. For example, this disc 130 may be provided with a plurality of equidistant poles 131 having a convex profile, with sharp poles in the form of teeth 132 disposed in between. This disc may be combined with a disc 133 illustrated in Figure 30, in which the poles 134 are in the form of tapered teeth. The poles 131 will have greater effect on the string than the poles 132 and 134.

Figure 33:
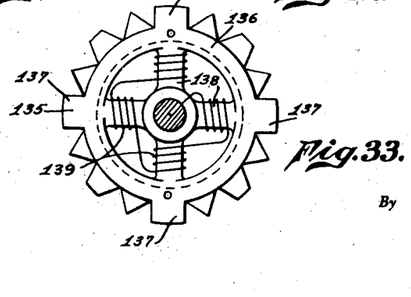
Figure 33 is a side elevation of a composite rotor composed of discs with poles of different character, and in which the poles are excited by electric circuits passing around them.

In Figure 33 I illustrate a composite rotor 135, in which I employ a disc 136 in the form of a ring with four poles 137 which are in line with spokes or exciting poles 138. These exciting poles 138 carry coils 139 which are connected in series and wired into a circuit such as the circuits described above. This circuit would be closed by a corresponding piano key. The periphery of this rotor has the same pole arrangement as that illustrated in Figure 29, and differs from the rotor illustrated in Figure 29, by reason of the provision of the coils and exciting poles.

Figure 34:
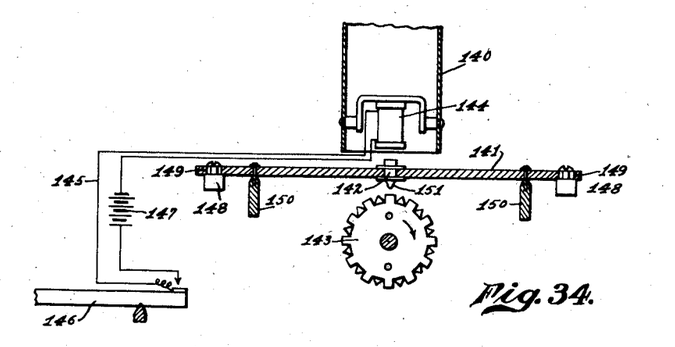
Figure 34 is a diagrammatic view illustrating an embodiment of the invention, in which a rotor of composite type is employed to cooperate with an electromagnet to vibrate a vibrator such as a reed, the volume of the sound being increased by the use of a resonator. The circuit through the magnet is illustrated as controlled by one of the piano keys.

In Figure 34 I illustrate an adaptation of my invention for cooperation with a resonator such as an organ pipe 140 below which a vibrator or reed 141 is mounted, said reed carrying an armature 142 to cooperate with a composite rotor 143. Above the armature, and if desired, within the lower end of the organ pipe, an electromagnet 144 is mounted, the coil of which is connected into a circuit 145 including a piano key 146, and a suitable source of E. M. F. such as a battery 147. The ends of the reed may be provided with adjustable weights 148 carried in slots 149 for tuning the reed. Just inside of the tuning weights, fixed supports 150 may be provided for the reed. Any suitable means such as that illustrated in Figure 6, may be employed for moving the rotor toward or from the reed to control the volume of the tone produced by the reed and organ pipe. If desired, the lower end of the armature 142 may be formed with a tapered tip 151.

Figure 35:
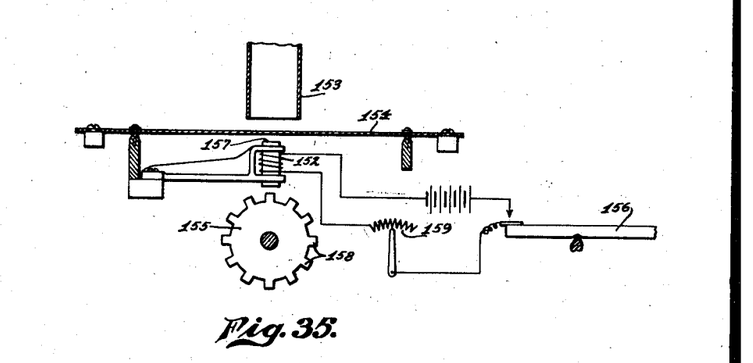
Figure 35 is a view similar to Figure 34, but illustrating another embodiment of the invention, in which a vibrator or reed is employed with a resonator above it, and with an electromagnet below it. In this embodiment of the invention, the rotor is located below the electromagnet.

A modification of the idea illustrated in Figure 34 is illustrated in Figure 35, in which the electromagnet 152 is not mounted in the organ pipe 153, but is mounted below the reed 154, and adjacent the lower end of the electromagnet, a rotor 155 is mounted. When the key 156 is depressed, a circuit is closed through the coil of the electromagnet, and the lines of force of the armature 157 are varied inductively by the teeth or poles 158 of the rotor as it passes. The frequency of the passing of these poles should be the same as the natural vibration of the organ pipe above the reed. This relation is also true of the construction illustrated in Fig. 34.

Referring again to Figure 35, the volume of the sound may be controlled by a rheostat 159 controlled at will by a pedal or other means not illustrated.

Figures 19, 20, 21, 22, 23, 36:
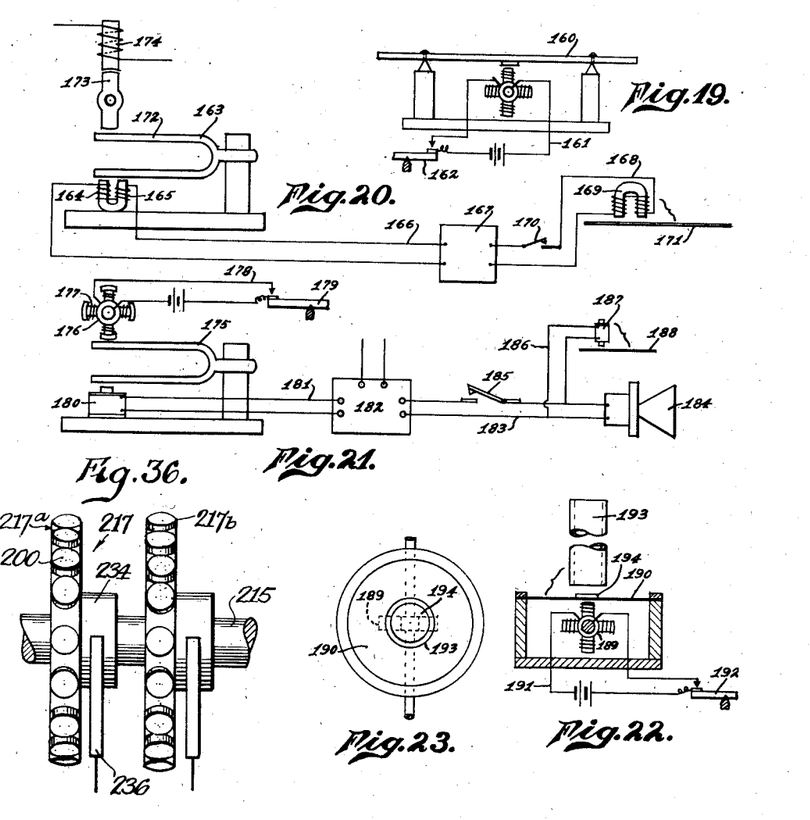
Figure 19 is a diagrammatic view illustrating a rotor mounted adjacent a vibrator, in the form of a reed carrying an armature, the said armature being located adjacent to the path of the poles of the rotor, and with the coils of the poles in a circuit controlled by key.
Figure 20 is a diagrammatic view illustrating an embodiment of the invention, in which I employ a vibrator such as a tuning fork, in which vibrations are induced in accordance with my invention, so as to develop pulsations in an electric circuit, the said pulsations being amplified so as to enable them to cooperate with an electromagnet adjacent the string for vibrating it.
Figure 21 is a view similar to Figure 20, but illustrating the key-controlled circuit for the rotor, and showing a circuit for carrying an amplified pulsating current connected up to a loud speaker. This view also illustrates a modification of the use of a lateral circuit taken off from the loud speaker circuit, for energizing an electromagnet to vibrate a string.
Figure 22 is a diagrammatic view illustrating a vibrator such as a diaphragm actuated by a key-controlled circuit passing through a rotor below the diaphragm and cooperating with an armature on the diaphragm. This view illustrates the use of a resonator such as an organ pipe cooperating with the vibrating diaphragm to give increased volume to the tone produced.
Figure 23 is a plan of the apparatus illustrated in Figure 22.
Figure 36 is a fragmentary view showing two adjacent rotors and a portion of the shaft carrying them, broken away.

In Figure 19, I illustrate an embodiment of the invention in which a rotor of the type illustrated in Figure 14 is employed for vibrating a reed 160, the circuit 161 through the coils of the rotor being closed at will by means of contacts on the rear end of a key 162.

In Figure 20, I illustrate another embodiment of the invention in which I employ a resilient vibrator such as a tuning fork 163, which is vibrated by the action of magnetic lines of force, and with which I associate a pick-up device 164, preferably in the form of a bipolar magnet, the coils 165 of which are connected into a circuit 166, said circuit being connected with an amplifier 167 with an extension circuit 168 beyond, and this latter circuit preferably includes a bipolar electromagnet 169, the coils of which are connected into it. This secondary circuit may be closed at will, by a piano key illustrated diagrammatically by a switch 170. Adjacent the electro-magnet 169, the vibrator or string 171 to be vibrated, is mounted.

Although if desired, the electro-mechanical means for vibrating the tuning fork may operate upon the same tine that is adjacent to the electromagnet 164, I prefer to have this electro-mechanical means cooperate with the other tine 172 of this fork. In the present instance, I illustrate a bipolar rotor 173, the poles of which are diametrically opposite to each other, and this rotor is mounted for rotation below a constantly energized electromagnet 174. This, of course, will produce continuous vibration of both tines of the tuning fork. If the sound produced by the tuning forks tends to produce an audible hum, this difficulty can be overcome by simply locating this part of the apparatus a short distance from the location of the piano or other instrument, the vibrators of which are actuated directly by the electromagnets 169.

In Figure 21, I illustrate another adaptation of the idea embodied in Figure 20, in which the tuning fork 175 is vibrated by a rotor 176 having exciting coils 177 on its poles, which are connected in an electric circuit 178 closed by a corresponding piano key 179. The lower tine of the tuning fork has a pick-up device 180 mounted adjacent to it, and by this means pulsations are produced in a circuit 181 extending to an amplifier 182. Beyond the amplifier an extension circuit 183 may be provided, including a loud speaker 184, and a tappet 185 for closing this circuit at will. If desired, another extension circuit indicated by dotted lines 186, can be run off from the wires of the circuit 183 and connected to an electromagnet 187 for vibrating a piano string 188. This enables music to be produced in accordance with my apparatus, through a loud speaker, and the same circuits to be employed for playing a piano or organ in another room, or at a distance from the loud speaker.

In Figures 22 and 23, I illustrate an adaptation of the invention, in which I place a rotor 189 below a vibrator such as a diaphragm 190, the said rotor having poles excited by coils connected in a circuit 191 which may be closed at will by a key 192, such as a piano key. This rotor may be mounted in a box, and above the diaphragm an organ pipe 193 may be supported as a resonator. If desired, the upper side of the diaphragm above the shaft of the rotor, may be provided with an armature 194.

Figures 2, 3, 4, 5:
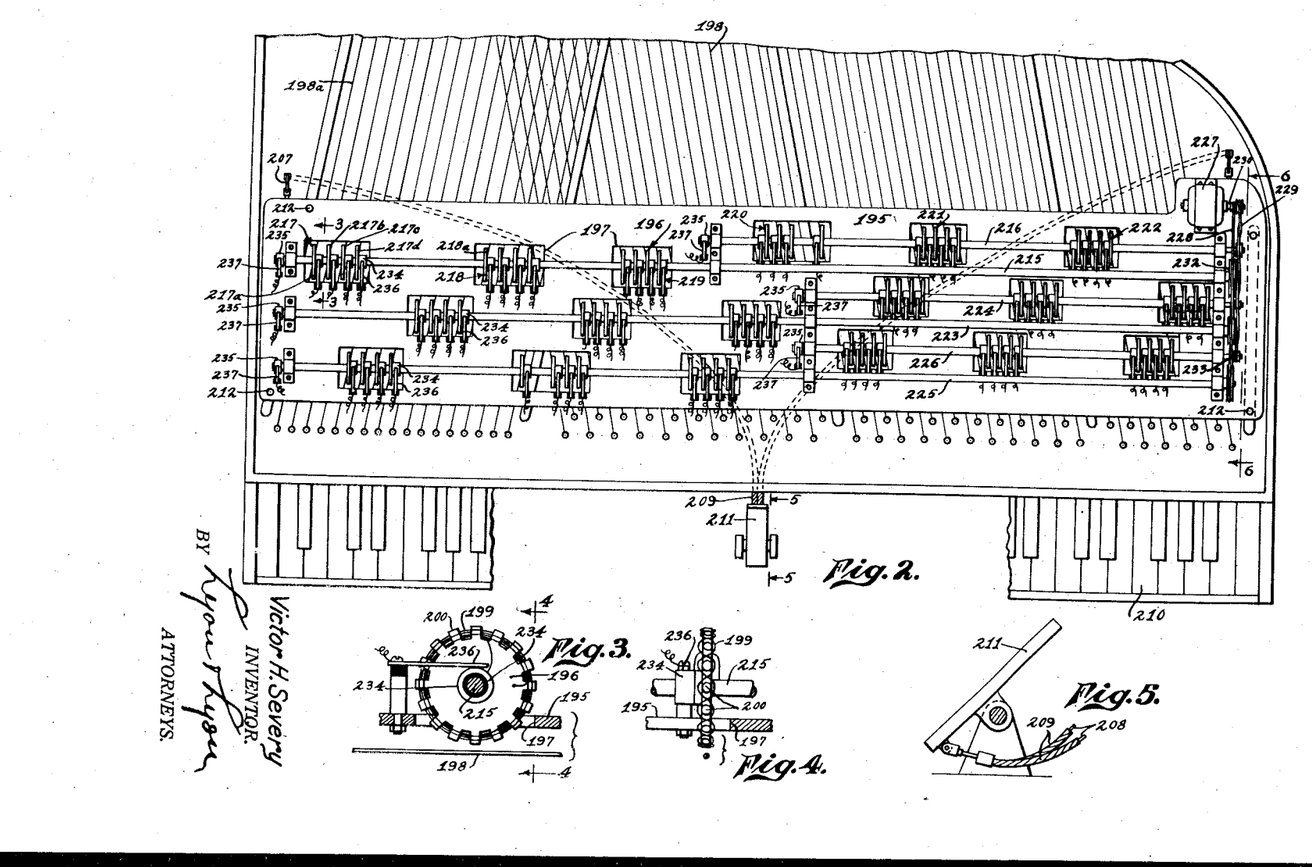
Figure 2 is a plan of the forward portion of a piano, with the keyboard and a portion of the sounding-board broken away, and illustrating my improvement applied as an accessory set in place adjacent to the strings.
Figure 3 is a vertical section taken about on the line 3—3 of Figure 2, upon an enlarged scale, certain parts being broken away and illustrating a type of rotor in which the poles of the rotor are excited by coils passing around the same.
Figure 4 is a section taken about on the line 4—4 of Figure 3, certain parts being broken away.
Figure 5 is a vertical section taken about on the line 5—5 of Figure 2, upon an enlarged scale, certain parts being broken away, and particularly illustrating a pedal as actuating means for raising or lowering the rotors bodily, to vary their distance from the strings, and thereby control the volume of the music produced.
Figures 6, 7:
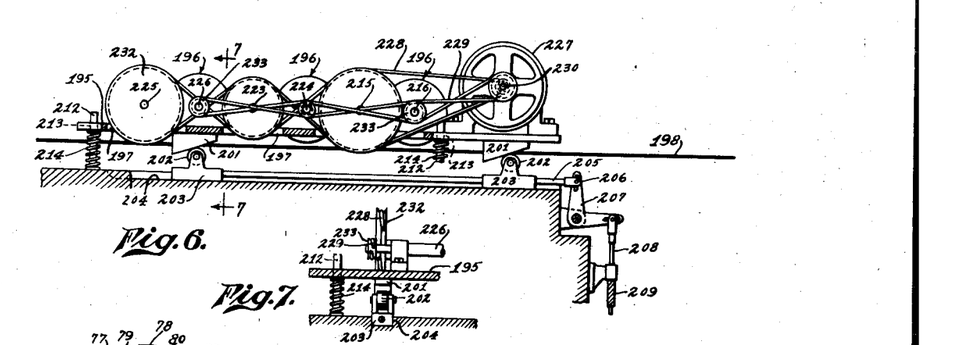
Figure 6 is an end elevation in partial section, taken about at the location of the line 6—6 of Figure 2, but upon an enlarged scale. This view particularly illustrates a means for driving the rotors, and means for raising or lowering the carriage which supports the rotors, for changing the volume of music produced.
Figure 7 is a vertical section taken about on the line 7—7 of Figure 6, and further illustrating details of means for supporting and adjusting the height of the rotor carriage.

While the improvements described hereinabove may be embodied and built in permanently into a piano or other instrument, in Figures 2 and 6 I illustrate an embodiment of the invention, in which the magnetic actuators for the strings are constructed as an operative unit and mounted on a carriage 195, said carriage being provided with a plurality of shafts carrying the rotors, said rotors being indicated generally by the numeral 196. The carriage is in the form of a board having openings 197 through which the lower edges of the rotors may project (see Fig. 3) so that they lie near their corresponding strings such as the string 198. These strings are devoid of armatures. (See Fig. 3.) By a circuit arrangement which will be described hereinafter, when any key corresponding to a certain rotor is depressed, the circuit will be closed through the coils 199 around the poles 200 of the rotor. The poles are then excited and as each pole passes the string, it attracts the string with a maximum magnetic force. These maximums alternate with periods of minimum attraction as the gap between two poles is passing the string. In the manner described hereinabove, by rotating the shafts at predetermined speeds, and by providing a predetermined number of poles on each rotor, the poles can be made to pass the strings at a frequency corresponding to the natural period of vibration of the string. This carriage may be employed on an upright piano or on a grand piano. In any case, it should be mounted so that it can be moved toward or away from the strings. The preferred construction for this purpose is illustrated in Figure 6, and consists in supporting the carriage on wedge blocks 201 which rest upon antifriction means such as rollers 202, said rollers being mounted respectively on slide blocks 203 which are guided to slide in grooves such as the goove 204. These blocks 203 are connected to a stem 205, the end of which may have a pin and slot connection 206 with a bell crank lever 207. This bell crank lever may be actuated at will by a control wire 208 carried in a flexible sheath 209 that extends down to a point below the keyboard 210 (see Fig. 2) at which point the end of each wire is attached to the lower end of a pedal 211 (see Fig. 5). There are preferably two of these control wires which extend in opposite directions to the ends of the carriage, as indicated in Figure 2.

The carriage 195 is preferably guided in its up and down movements on suitable pins 212 that pass through suitable guide openings 213 in the carriage, and the weight of the carriage and parts carried by it, is counterbalanced by means of coil springs 214 mounted on these pins. The provision of these springs 214 increases the facility of raising the carriage my means of the control wires 208.

The shafts that carry the rotors 196 are preferably composed of three long shafts for operating the bass notes, and three short shafts for operating the treble notes. In Figure 2, 215 indicates the long shaft which is paired with the corresponding short shaft 216. The long shaft 215 has three sets of rotors indicated by the numerals 217, 218 and 219. There are four rotors in each set. The rotors composing the set 217 are mounted on the shaft close together, and are mounted for actuating the four bass notes corresponding to the string 198a that produces the lowest note on the scale. This shaft is rotated at approximately two revolutions per second. The rotor 217a of this set should have sixteen poles or teeth spaced equidistant on its periphery, as indicated in Figure 3. The rotor 217b next to it should have seventeen poles or teeth, while the next rotor 217c should have eighteen teeth, and the next rotor 217d should have nineteen teeth. If this shaft is rotated at the stated speed, these rotors will vibrate the strings corresponding to these notes in their natural periods of vibration. The rotor 218a of the set 218 is located over the thirteenth note from the bass end of the instrument. This rotor should have thirty-two teeth, and the next rotor in this set should have thirty-four teeth, the next thirty-six, and the next thirty-eight. With this same speed of rotation of two revolutions per second, these numbers of poles or teeth on the rotors of this set will vibrate their corresponding strings in their natural period of vibration. The rotors of the set 219 have double the number of teeth or poles as the corresponding rotors of the set 218, that is to say, beginning from the left as viewed in Figure 2, they would have sixty-four teeth, sixty-eight teeth, seventy-two teeth, and seventy-six teeth. The left-hand rotor of this set is located over a string which produces a note that is an octave higher than the corresponding rotor 218a of the set 218.

The shaft 216 carries three sets of rotors, namely, 220, 221 and 222. This shaft is driven at eight times the speed of the shaft 215, the rotors of the set 220 beginning from the left, have 16, 17, 18 and 19 teeth respectively, like the set 217a. The set 221 of rotors have the same relation as regards their number of teeth, to the set 220, as the relation of the rotors of the set 218 to the set 217, and likewise, the rotors of the set 222 have the same relation as regards their teeth, to the set 221, that the teeth of the set 219 have to the teeth of the rotors of the set 218.

The shafting includes an intermediate pair of shafts 223 and 224 which correspond respectively, to the shafts 215 and 216, and each of these shafts carries three sets of rotors with the same relation of teeth or poles as described in connection with the shafts 215 and 216, that is to say, the left-hand set of rotors on the shaft 223 have 16, 17, 18 and 19 teeth respectively, etc. The shaft 223 should be driven at 3.17 revolutions per second, and the shaft 224 is driven at eight times that speed. It should be noted that the left-hand set of rotors on the shaft 223, corresponds to the four strings that are just to the left of the set 218 of rotors. The other sets on this shaft are correspondingly located with respect to the corresponding sets on the shaft 215.

The foremost shafts 225 and 226 carry rotors in sets, the same as the other two sets of shafts, and the left-hand set of rotors on the shaft 225, correspond to the four strings just to the right of set 217 of the shaft 215, and the rotors of this set have respectively, 16, 17, 18 and 19 teeth or poles. The adjacent set of rotors on this shaft 225, have 32, 34, 36 and 38 teeth respectively, and the left-hand rotor of this second set is over the string corresponding to the first octave above the fifth note of the piano which is played by the left-hand rotor of the first set on this shaft. In the right-hand set of rotors on this shaft 225, the corresponding rotors have double the number of teeth of the intermediate set on this shaft, and the left-hand rotor of the right-hand set is mounted over the string which is an octave higher than the left-hand rotor of the intermediate set. The shaft 226 has three sets of rotors corresponding to the sets 220, 221 and 222 of the shaft 216, and disposed so as to lie over the next four strings to the right of each of the other sets. The rotors of the left-hand set on shaft 226 have 16, 17, 18, and 19 teeth respectively, and the corresponding rotors in the intermediate set on this shaft, have double this number of teeth. Likewise, the rotors in the right-hand set on the shaft 226 have double the number of teeth of the corresponding rotors in the intermediate set on this shaft 226.

The shaft 225 is rotated at a speed of 2.52 revolutions per second, and the shaft 226 has eight times this speed of rotation.

The shafts may be driven at the necessary predetermined speeds by gearing or by any other suitable means. I prefer however, to drive these shafts with belts, on account of the fact that the speed ratio from each shaft of lower rotation to each corresponding shaft of higher rotation, is 1.26.

In Figure 2, I have illustrated a belt drive from an electric motor 227 that is mounted on the carriage 195. I prefer to drive the relatively slow moving shafts 215, 223, and 225 on one belt 228, and the relatively fast moving shafts on another belt 229. These belts run over two adjacent pulleys on the shaft 230 of the motor, and pass around corresponding pulleys 232 and 233 mounted on the fast and slow shafts respectively. The motor 227 is a synchronous motor designed to run at a certain predetermined speed, and the diameters of the pulleys 232, 233, and the pulleys on the shaft 230, are such as to give the shafts the proper predetermined speed.

Figure 1:
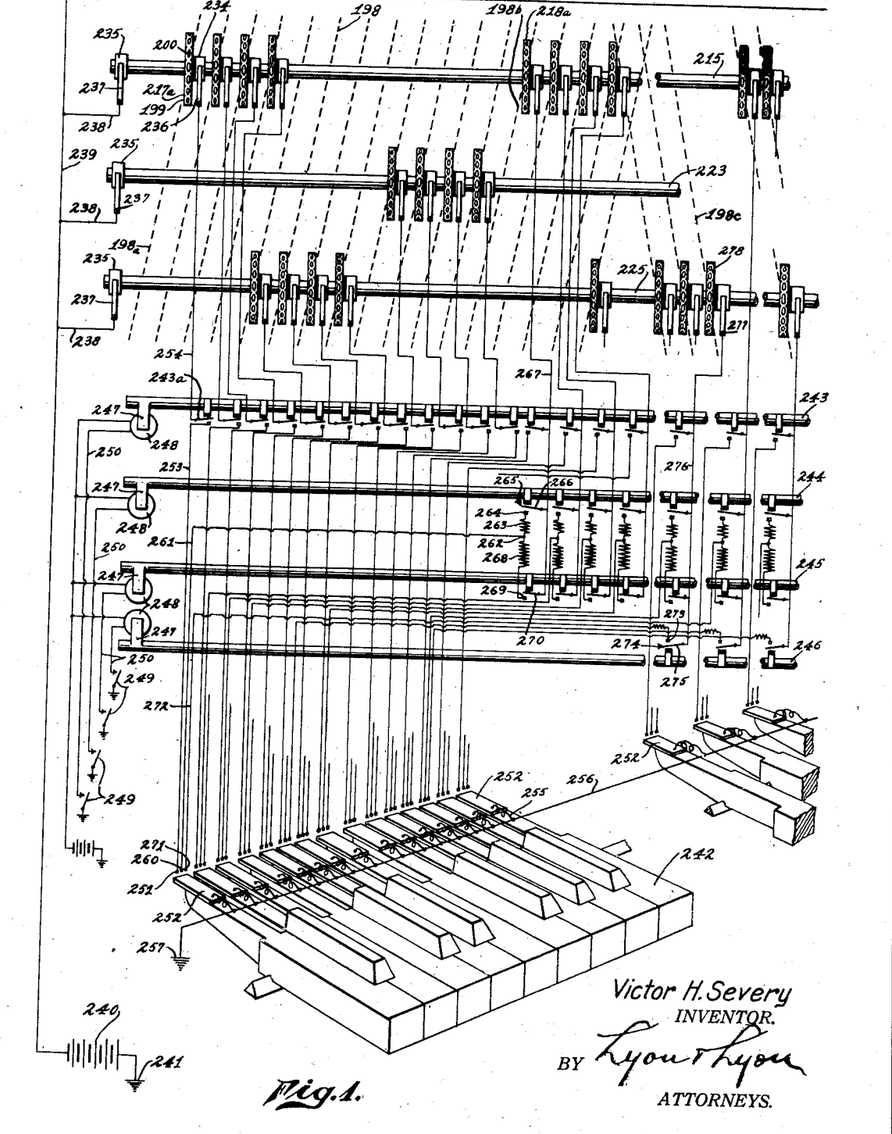
Figure 1 is a diagrammatic view, certain parts being broken away, illustrating the essential features of my apparatus as applied to a piano, and illustrating the circuits and switches which may be employed with the invention for producing harmonic tones simultaneously with fundamental tones, the harmonic tones and the fundamental tones being produced by different strings.

In Figure 1, I illustrate diagrammatically, the essential features of the wiring arrangement corresponding to the rotor arrangement illustrated in Figure 2. This view however, shows only the three shafts 215, 223, and 225, but the wiring arrangement is substantially the same for the short shafts. As illustrated in Figure 1, each rotor such as the rotor 217a is provided with poles such as the poles 200, and carrying winding such as the winding 199. One end of each winding is attached to a corresponding insulated collar 234 on the shaft, and the other end of the winding is connected to another insulated collar 235. Each collar 234 has a corresponding brush 236, and each collar 235 has a corresponding brush 237. The brushes 236 are connected to suitable conductors and switches with corresponding keys of the piano keyboard, as will be described hereinafter. The other brushes 237 are connected in parallel by conductors 238 leading off from a trunk wire 239, which trunk is connected with a source of E. M. F. such as a battery 240, the other side of which is connected to a ground 241.

The wiring arrangement for the different shafts, is substantially the same as that described above. Interposed between the keys 242 and their corresponding brushes 236, in the wiring system, I provide a plurality of switches, for example, a fundamental switch 243 which may be referred to as a first partial switch. I also provide a "second partial" switch 244, and another "second partial" switch 245, and a "third partial" switch 246. These switches may be closed at will by the player. Any suitable means may be employed for this purpose. In the present instance, I illustrate electric means for this purpose. In order to accomplish this, each of the switches may be in the form of a shaft carrying a rigid arm 247, which operates as an armature for an electromagnet 248. When the coil of the magnet 248 is energized, the corresponding multiple switch will be closed. For example, when a tappet 249 corresponding to the fundamental switch is closed, a circuit through wire 250 will be closed, thereby energizing the electromagnet corresponding to the fundamental switch. This will set up a circuit corresponding to each of the keys 242, so that when any of the keys 242 is depressed, a circuit corresponding to its piano string will be closed through the rotor over that string. For example, assuming that the fundamental switch 243 has been closed, and assuming that the first note of the scale is to be struck, then the depression of the first bass key will close a circuit through the individual fundamental switch 243a from a contact 251 at the rear end of the piano key, which is struck by a contact plate 252 on the key. This closes a circuit through conductor 253, through the individual switch 243a, and through conductor 254 that leads up to the brush 236. For each key 242 of the keyboard, there is a contact corresponding to the contact 251, so that when any key is depressed, a circuit will be closed to operate its corresponding string. In order to accomplish this, all of the contact plates 252 are preferably wired in parallel through the agency of conductors 255, which connect to a trunk line 256 connected to a ground 257 at one side, and passing all the keys. The circuit arrangement for playing a "second partial" corresponding to any lower note sounded, is substantially the same as described in my prior Patent No. 2,006,443, granted July 2, 1935, on an Electrically controlled piano. However, in the present instance, I provide different resistances for the "second" and "third" partials, as will now be described. Suppose for example, that the first bass note of the keyboard is struck. This will vibrate the corresponding string 198a which produces the lowest note on the scale. In addition to this, a circuit will be closed by way of a contact 260 alongside of the contact 251, said contact 260 being connected by a conductor 261 to a terminal 262, and thence through a relatively low resistance 263 to a switch contact 264 corresponding to an individual switch 265 of the "second partial" switch 244. If this switch 244 has been closed, the individual switch 265 will be closed, setting up a circuit through the movable switch member 266, and through a conductor 267 up to the brush corresponding to the rotor 218a already described. This rotor is located over a string 198b which will give an octave of the first note of the piano. There is wiring corresponding to this described, for all of the keys, except of course, the treble keys which are too near the upper end of the scale to permit of their having any higher partials or harmonics that can be played on that instrument.

If the "second partial" switch 245 has been closed instead of the "second partial" switch 244, current will flow from the terminal 262 down through a relatively large resistance 268 to the corresponding contact point 269 of an individual switch 270 of the "second partial" switch 245, and from this point current will flow through the movable switch member 270 through the wire 267, up to the rotor 218a. This will sound the same note as is sounded when the switch 266 is closed, but gives the partial a reduced volume. In this way, by employing two "second partial" switches, I can sound a "second partial" note or harmonic with two different volumes, thereby changing the timbre of any tone. If the "third partial" switch 245 has been closed before the first bass key 242 has been struck, then a circuit will be set up for producing a "third partial" harmonic corresponding to the first string of the piano. In order to accomplish this, I provide a third contact 271 which is connected to a conductor 272 that extends to a contact 273 corresponding to an individual switch 274 of the "third partial" multiple switch 246, and if this "third partial" switch 246 has been closed, then current will flow from the fixed contact 273 through the movable contact 275 of the individual switch 274, and will pass up by wire 276 to the brush 277 that corresponds to rotor 278 on the shaft 225, and which is located over a string 198c of the piano, which will give a "third partial" harmonic corresponding to the first string of the bass.

Figure 24:
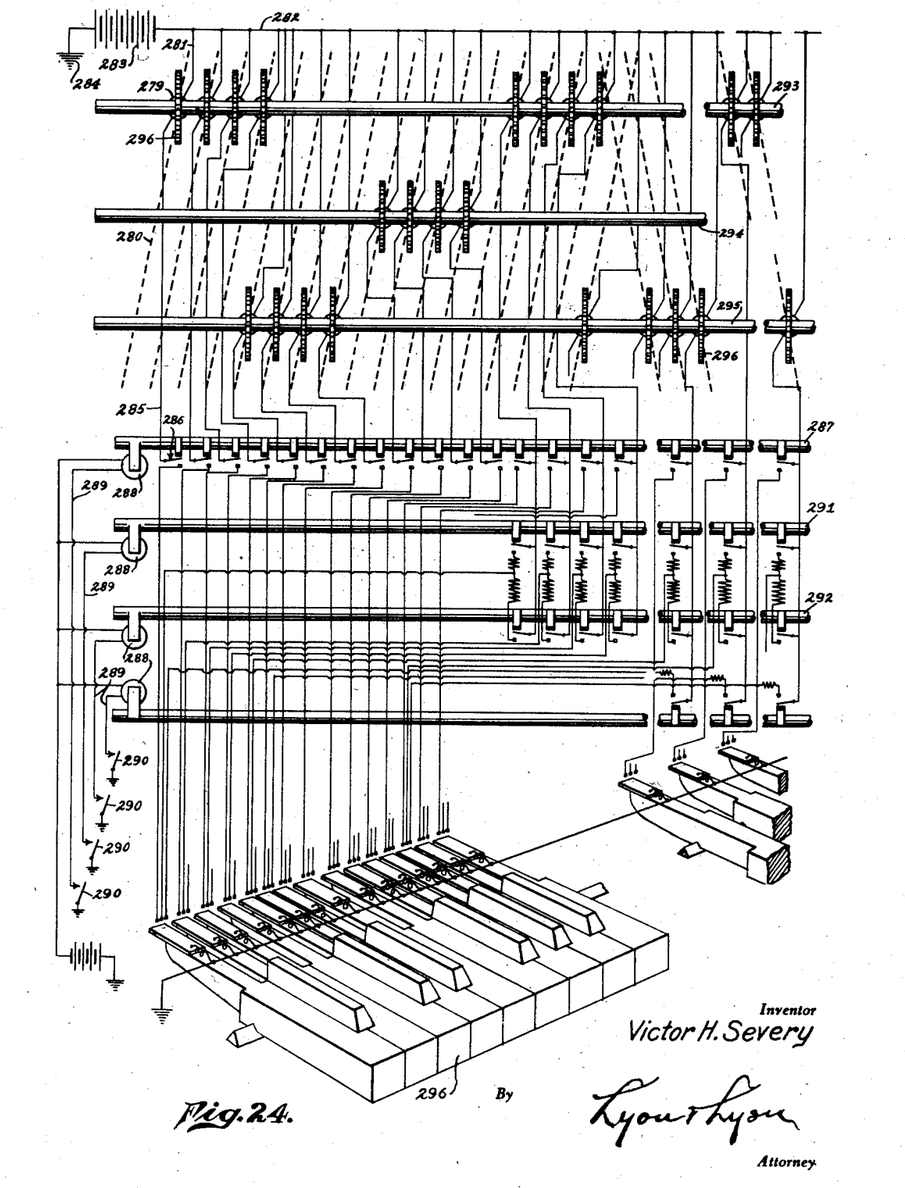
Figure 24 is a diagrammatic view corresponding to Figure 1, and illustrating an embodiment of the invention in which the vibrating means for the strings is of the same type illustrated in Figure 18, that is to say, instead of having the poles of the rotors excited by coils on them, the rotors have the form illustrated in Figure 18, so as to enable them to cooperate with corresponding magnets placed on the other side of the strings. This view also illustrates the circuit arrangement together with switches for enabling harmonic partials to be sounded with strings producing the fundamental tone.

Figure 24 is similar to Figure 1, and illustrates the essential features of a general arrangement of rotors and wiring, etc. The arrangement in this view is substantially the same as in Figure 1, except that the rotors illustrated, do not have electrically excited poles. In other words, the rotors are of the type illustrated in Figure 25, and below each rotor I provide an electro-magnet 279 which is located below the corresponding string 280, and preferably mounted on a carriage such as the carriage or magnet bar 107. These electromagnets 279 are wired in parallel on branch conductors 281 from a main conductor 282 connected to one side of a battery 283, the other side of which is connected to a ground 284. Beyond each electro-magnet 279 a circuit wire 285 is provided that corresponds to the wires 254 referred to in Figure 1. In other words, each of these wires 285 leads down to the corresponding individual switch 286 controlled by a multiple "first partial" switch 287, said multiple switch 287 being controlled by an electro-magnet 288 through a circuit 289 including a tappet 290 for controlling it. This arrangement also includes two "second partial" switches 291 and 292 corresponding to the switches 244 and 245 already described and wired in the same way to enable the "second partials" to be sounded in different volumes, according to whichever one of the switches 291 and 292 is closed. In this Figure 24, the shafts 293, 294 and 295 that carry the rotors 296 corresponding to the shafts 215, 223 and 225, and have the same arrangement of rotors upon them. The rotors have the same arrangement of poles, and the relation of the number of poles is also the same as described in connection with Figures 1 and 2. The advantage of using plain rotors of disc-form as illustrated in Figure 24, as compared with the wired type of rotor, is that a much simpler construction attains the desired results. In other words, the single electromagnet 279 avoids the necessity for winding all of the rotors with wires. The vibration of the strings is, of course, brought about by induced magnetic forces as each pole of an armature passes the electromagnet 279. If a piano key 296 corresponding to a certain string has been pressed down, a circuit set up through the fundamental switch, and passing through either of the "second partial" switches will be closed, energizing the corresponding electromagnet 279, so that the string corresponding to the key, will be vibrated.

The general mode of operation of the apparatus will now be briefly described. In the embodiment illustrated in Figures 1 and 2, by pressing the proper tappet 249, the corresponding electromagnet 248 for the fundamental switch 243 will effect the closing of this switch. This will set up circuits through all of the windings of the rotors, ready to be closed by the depression of any key. Whenever any key is depressed, for example, the key 242 (see Fig. 1) the contacts 251 and 252 close the circuit through the corresponding rotor 217a, and this energizes the poles of this rotor. The shaft 215 is being driven at a speed such that as the sixteen poles of this rotor pass the string 198a, a series of attractive impulses will be given to the string corresponding to its period of vibration. This will cause the string to vibrate and produce its musical tone. If the tappet 249 corresponding to the "second partial" switch 244 has been closed, then this switch will be closed in addition to the fundamental switch 243. When any piano key, for example, the key 242 is depressed, a circuit will be closed from contact 260 and through the wire 261, and through resistance 263 and individual switch member 266 to the wire 267, and this will energize the rotor 218a and vibrate the string below it so as to produce a harmonic tone corresponding to the first bass note produced by the lowest bass string of the piano. If the switch 245 is closed instead of the switch 244, then the same rotor 218a will be energized, but the current will be reduced by reason of the increased resistance 268. This reduces the volume of the harmonic tone produced by the string below this rotor 218a.

By rocking the pedal 211 (see Fig. 5) up or down, the control wires 208 will operate the bell crank lever 207 (see Fig. 6) and this will move the slides 203 in or out under the wedges 201, thereby raising or lowering the carriage 195 that supports all the rotors. In this way, the volume of the music produced by all the strings is controlled. When the rotors are constructed as illustrated in Fig. 24 and Fig. 25, the circuit closed by any key, does not pass through any winding on the rotors, because these rotors have no windings, but are plain metal discs with teeth or poles which pass above their corresponding electromagnets 279 through which the circuit is closed. This will cause vibration of the string. The magnets 279 are preferably mounted in the manner illustrated in Fig. 25, enabling the bar 107 that carries the magnets, to be raised or lowered at will by rocking the pedal 120. This movement is effected through a hydraulic tubing 118.

By employing a rotor composed of discs with different character of poles as illustrated in Fig. 28, the rotors themselves can produce harmonic vibrations in the string.

In the embodiment of the invention illustrated in Figure 10, in which permanent magnets are employed on the rotors, the effect of the magnetism on each string is eliminated by the shield 67, and each shield is connected with a corresponding key so that when the key is depressed, the shield will be withdrawn and the corresponding string will be vibrated.

What I claim is:

1. In a magnetically controlled stringed instrument, the combination of a plurality of strings mounted for vibration to produce the different notes of a musical scale, a shaft mounted for rotation and extending past the strings, rotary members mounted on the shaft corresponding to the different strings, said rotary members having circumferentially disposed equidistant poles operating to pass their corresponding strings as the shaft rotates, and means for rotating the shaft at a speed to cause the poles to pass the strings at a frequency corresponding to the period of vibration of the strings.

2. In a magnetically controlled stringed instrument, the combination of a plurality of strings mounted for vibration to produce the different notes of a musical scale, a plurality of shafts mounted for rotation and extending transversely of the strings, sets of rotary members mounted on the said shafts, the rotary members of each set having a plurality of circumferentially disposed equidistant poles, the number of said poles on the rotary members increasing gradually from the strings corresponding to the low notes of the scale toward the strings corresponding to the higher notes of the scale, and means for rotating the shafts at a speed to cause the poles to pass the strings respectively at a frequency corresponding to the period of vibration of the strings.

3. In a magnetically controlled stringed instrument, the combination of a plurality of strings mounted for vibration to produce the different notes of a musical scale, a plurality of shafts mounted for rotation and extending transversely of the strings, sets of rotary members mounted on the said shafts, the rotary members of each set having a plurality of circumferentially disposed equidistant poles, the number of said poles on the rotary members increasing gradually from the strings corresponding to the low notes of the scale toward the strings corresponding to the higher notes of the scale, means for rotating the shafts, a carriage supporting all of the shafts, and means for controlling the said carriage at will to move the rotary members toward or from the strings to control the volume of the sounds produced by the vibration of the strings.

4. In a magnetically controlled musical instrument, the combination of a plurality of vibrators for producing notes and octaves on a musical scale, keys corresponding to the vibrators, circuits corresponding to the keys and vibrators with means adjacent the vibrators for sounding the same when the corresponding key closes the circuit to the vibrator, a "second partial" switch, another "second partial" switch, a different resistance corresponding to each "second partial" switch, circuits through the "second partial" switches with means in the same for vibrating a vibrator higher up on the scale, and means for closing either of said "second partial" switches at will to vary the volume of the "second partial" tone.

5. In a magnetically controlled musical instrument, the combination of a plurality of vibrators for producing the different notes of a musical scale, rotary members of magnetic material mounted for rotation adjacent the vibrators respectively and having circumferentially spaced elements moving in a path near the vibrators as the rotary members revolve, said elements operating to oscillate the vibrators as they pass the same, and key-controlled means for effecting the production of the different musical notes.

6. In a magnetically controlled musical instrument, the combination of a plurality of vibrators for producing the different notes of a musical scale, rotary members mounted for rotation adjacent the vibrators respectively and having circumferentially spaced elements moving through a path near the vibrators as the rotary members revolve, and magnetic means associated with the rotary members to develop magnetic forces acting on the vibrators when each element passes the same.

7. In a magnetically controlled musical instrument, the combination of a plurality of vibrators for producing the different notes of a musical scale, rotary members mounted for rotation adjacent the vibrators respectively and having circumferentially spaced elements moving through a path near the vibrators as the rotary member revolves, magnetic means associated with the rotary members respectively to develop magnetic forces acting on the vibrators while the said spaced elements are passing the same, and hand-operated means for controlling the magnetic attraction of the said elements for the vibrators.

8. In a magnetically controlled musical instrument, the combination of a plurality of vibrators, a plurality of rotary members of magnetic material mounted for rotation adjacent the vibrators respectively, said rotary members each having circumferentially spaced poles moving in a path near the vibrators as the rotary member is revolved, electrical means for exciting the poles, including an electric circuit passing to the same respectively, and a key in each circuit for closing the same at will.

9. In a magnetically controlled musical instrument, the combination of a vibrator, a rotary member composed of a magnetic material, mounted for rotation adjacent the vibrator, said rotary member having equidistant circumferentially spaced poles moving through a path near the vibrator as the rotary member revolves, a frame mounted for movement toward or from the vibrator, an electromagnet mounted on the frame and disposed adjacent the vibrator, and a key-controlled electric circuit passing through the said electromagnet, said electromagnet cooperating with its corresponding rotary member as each pole passes the vibrator, to develop magnetic forces for actuating the vibrator.

10. In a magnetically controlled musical instrument, the combination of a string devoid of an armature and mounted to vibrate, a continuously driven rotary member located adjacent the string, an electromagnet mounted adjacent the string and on the side thereof remote from the said rotary member, a circuit passing through the electromagnet, a key for closing the circuit, and means controlled at will for regulating the attractive force developed by the current passing through the electromagnet, said rotary member and said electromagnet cooperating to vibrate the string.

11. In a magnetically controlled musical instrument, the combination of a plurality of vibrators for producing the different notes of a musical scale, rotary members corresponding respectively to the different vibrators, said rotary members being of magnetic material and mounted for rotation adjacent their corresponding vibrators and having circumferentially spaced projections moving in a path near the vibrators as the rotary members revolve, a carriage located on the opposite side of the vibrators from the rotary members, electromagnets mounted on the said carriage and corresponding to the different vibrators, a key-controlled electric circuit corresponding to each electromagnet and passing through the same, means controllable at will for moving the carriage toward or from the vibrators to alter the volume of the sound produced thereby, said projections cooperating with the said magnets to oscillate the vibrators as they pass the same.

VICTOR H. SEVERY.